Dec. 30, 1952     W. A. DERR     2,623,939

REMOTE-CONTROL SYSTEM

Filed April 2, 1949     6 Sheets—Sheet 1

WITNESSES:

INVENTOR
Willard A. Derr.
BY
ATTORNEY

Dec. 30, 1952   W. A. DERR   2,623,939
REMOTE-CONTROL SYSTEM
Filed April 2, 1949   6 Sheets-Sheet 2

INVENTOR
Willard A. Derr.
BY
G. M. Crawford
ATTORNEY

Dec. 30, 1952   W. A. DERR   2,623,939
REMOTE-CONTROL SYSTEM
Filed April 2, 1949   6 Sheets-Sheet 3
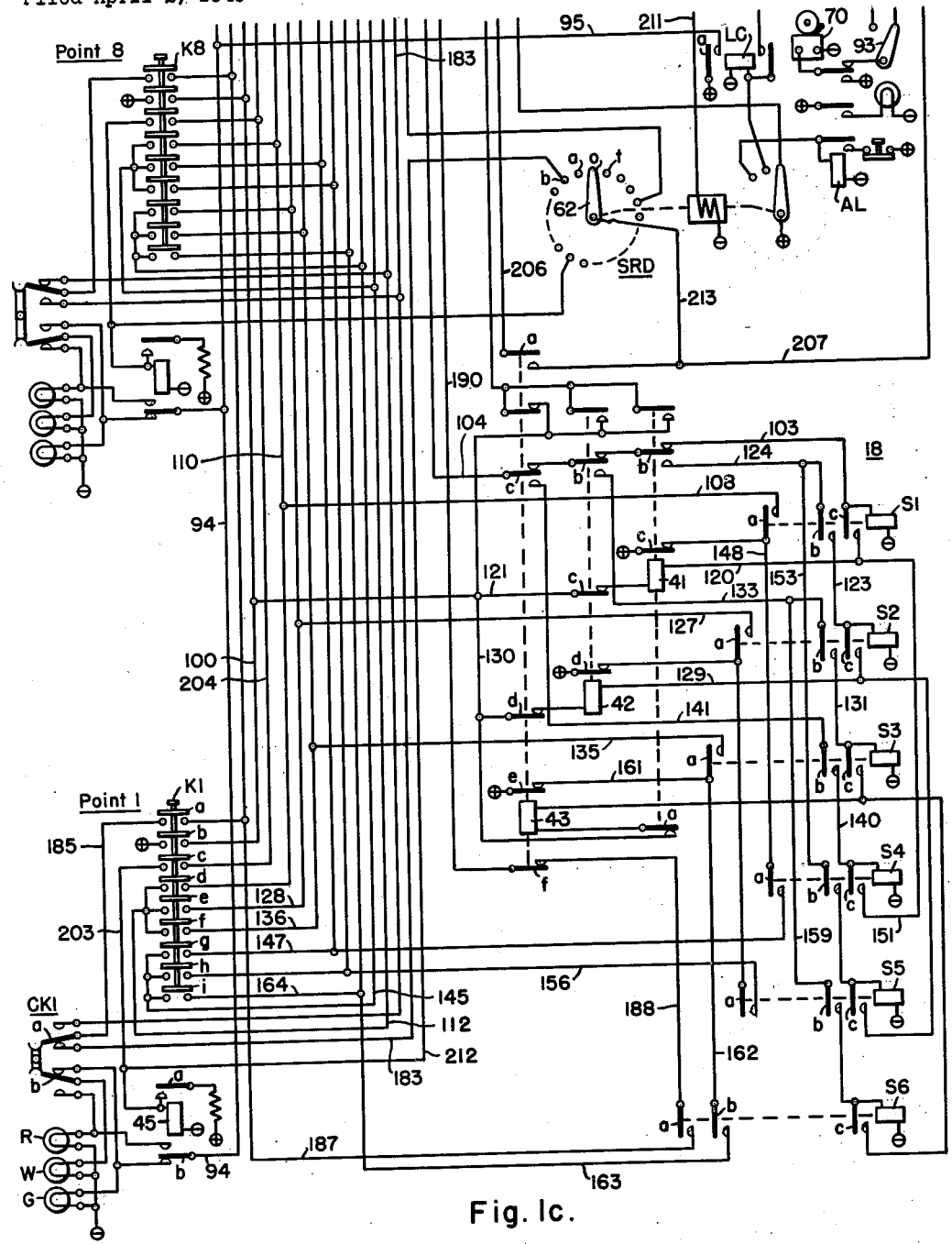
Fig. Ic.
WITNESSES:
Robert C Baird
F. V. Giolma
INVENTOR
Willard A. Derr.
BY
Geo. Crawford
ATTORNEY Dec. 30, 1952 W. A. DERR 2,623,939
REMOTE-CONTROL SYSTEM
Filed April 2, 1949 6 Sheets-Sheet 5

WITNESSES:
Robert C. Baird
F. V. Giolma

INVENTOR
Willard A. Derr.
BY
G. M. Crawford
ATTORNEY

Dec. 30, 1952 W. A. DERR 2,623,939
REMOTE-CONTROL SYSTEM
Filed April 2, 1949 6 Sheets-Sheet 6
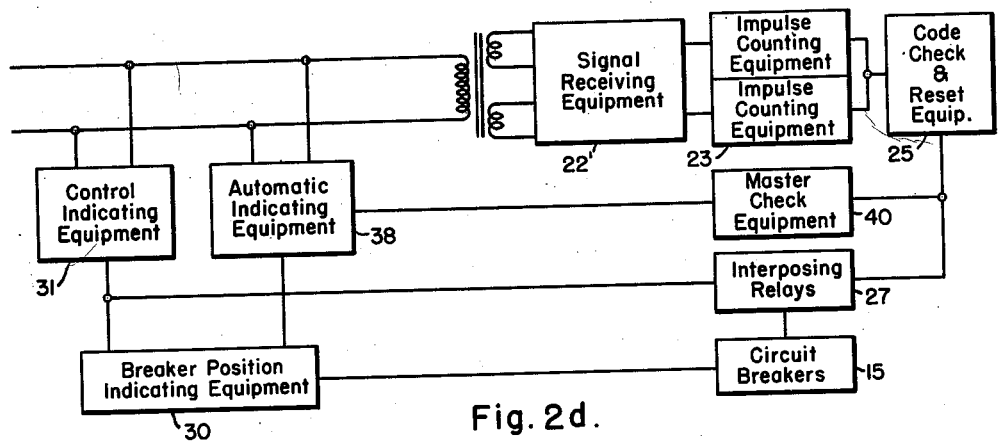
Fig. 2d.
Fig. 2e.
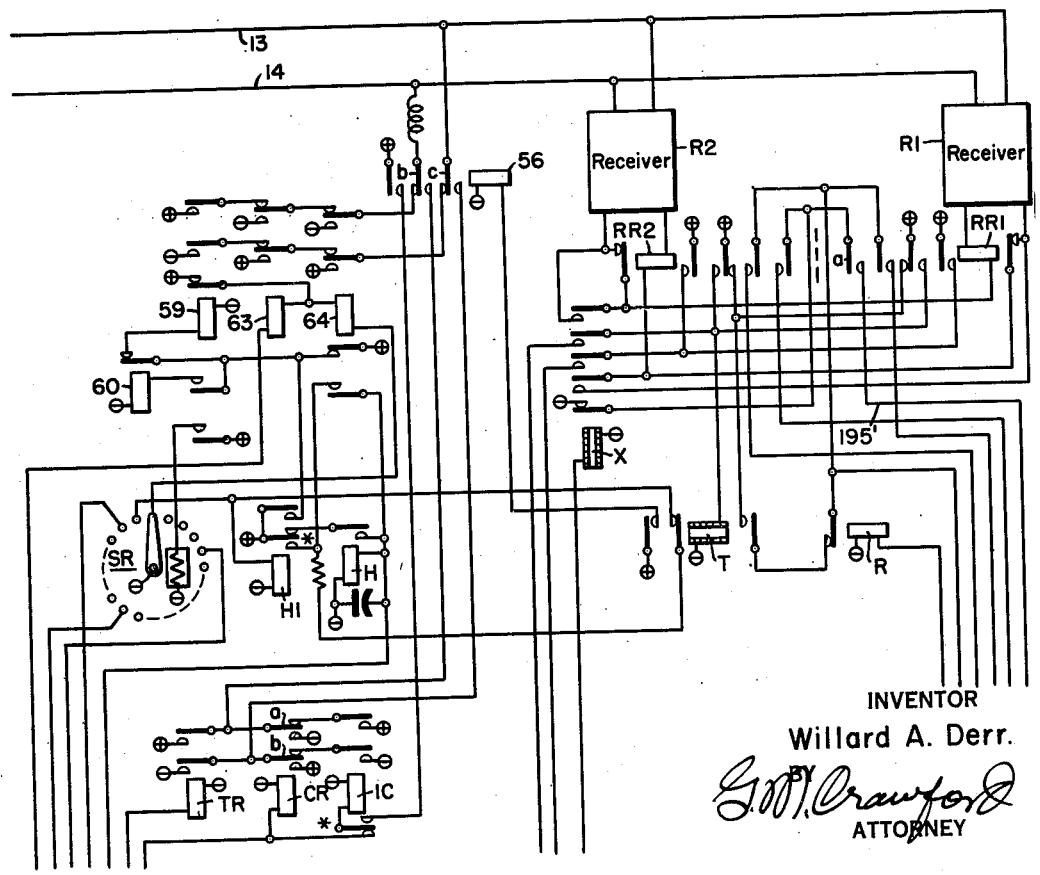
INVENTOR
Willard A. Derr.
BY
G. M. Crawford
ATTORNEY Patented Dec. 30, 1952

2,623,939

UNITED STATES PATENT OFFICE 2,623,939

REMOTE-CONTROL SYSTEM

Willard A. Derr, Pittsburgh, Pa., assignor to Westinghouse Electric Corporation, East Pittsburgh, Pa., a corporation of Pennsylvania Application April 2, 1949, Serial No. 85,138

11 Claims. (Cl. 177—353)

My invention relates, generally, to remote control systems, and it has reference in particular to supervisory control systems of the self-checking type.

Generally stated, it is an object of my invention to provide a supervisory control system of the self-checking type that is simple and inexpensive to manufacture and reliable and effective in operation.

More specifically, it is an object of my invention to provide a supervisory control system which utilizes different patterns of a predetermined number of each of two different kinds of signal impulses for selecting apparatus to be controlled at a remote location.

Another object of my invention is to provide for using code signals each comprising a predetermined number of impulses each of two different frequencies arranged in different patterns, so as to minimize errors in selection and make the system substantially self-checking.

It is also an object of my invention to provide a self-checking supervisory control system which utilizes code signals comprising equal numbers of impulses of opposite polarities arranged in different patterns.

An important object of my invention is to provide, in a self-checking supervisory control system, for using a chain of counting relays to control a pair of signal transmitting relays for producing distinctive signal impulses in different patterns or arrangements, and counting the signal impulses to determine the number of each kind and the total thereof so as to insure proper selection of the apparatus it is desired to control.

I also provide, in a self-checking supervisory control system, for using signals consisting of impulses of only two distinctive kinds in each direction between a dispatching office and a remote substation, and for counting the signal impulses transmitted to determine whether the proper point is selected, before transmitting a control code or impulse.

Another object of my invention is to provide, in a self-checking supervisory control system, for first selecting the particular point to be controlled, providing a check on the selection of the point, and then transmitting an operating code.

An important object of my invention is to provide, in a self-checking supervisory control system, for producing different arrangements of two distinctive signal impulses, and utilizing at a substation a chain of impulse counting relays which is selectively responsive to the distinctive signal impulses.

Yet another object of my invention is to provide, in a self-checking supervisory control system, for using a chain of counting relays to transmit different arrangements of two audio frequency signal impulses of different frequencies for selecting different operating points.

It is also an important object of my invention to provide, in a supervisory control system, for transmitting signal codes of a predetermined number of each of two distinctive impulse signals, and for releasing the system in the event that the total number of impulses is either less than or more than the predetermined number.

Other objects will in part be obvious and will in part be described hereinafter.

In practicing my invention in one of its forms, a plurality of circuit breakers or other apparatus units at a remote substation are controlled and supervised from a dispatching office over a single signalling channel by means of a self-checking supervisory control system.

A signal transmitter operable to apply impulses of opposite polarities to the signalling channel is provided at the dispatching office for operation under the control of a chain of impulse counting relays, so as to produce signals comprising a predetermined number of impulses of each polarity in different patterns, as determined by code selection circuits, which include a point selection key for each circuit breaker to be controlled.

Polarized signal receiving relays at the remote substation are selectively responsive to the impulses applied to the signalling channel, and each of them controls a chain of impulse counting relays which count the impulses and set up operating circuits for one of the interposing relays associated with each breaker. Code checking and reset relays are provided at the substation for releasing the substation equipment in the event that the predetermined number of impulses is not received.

An impulse of one polarity or the other is then transmitted, depending on whether the operate key of the selected breaker has been operated to the "trip" or "close" position. Indication control relays at the remote substation selectively energize the signalling channel with opposite polarities to operate position indicating relays and lamps at the dispatching office, depending upon the selected breaker operation.

Automatic operation of a breaker starts automatic indicating means including a stepping relay at the substation which drives a corresponding stepping relay at the dispatching office and selectively applies a potential to the signalling channel, depending upon whether a breaker is closed or open, so as to check the positions of the position indicating relays for each breaker at the dispatching office.

For a more complete understanding of the nature and scope of my invention, reference may be made to the following detailed description, which may be read in connection with the accompanying drawings, in which:

Fig. 2a is a schematic diagram of the supervisory control equipment at the substation corresponding to the dispatching office equipment of Fig. 1a;

Fig. 1c is a diagrammatic view of the impulse counting relay portion, and the remaining portion of the selection code circuits, of the dispatching office equipment shown in Fig. 1a, and is disposed to be positioned directly beneath Fig. 1b to complete the diagrammatic view of the equipment shown schematically in Fig. 1a;

Fig. 2c is a diagrammatic view of the counting relays and other substation equipment omitted from Fig. 2b, and necessary to complete the substation equipment shown schematically in Fig. 2a;

Fig. 2d is a schematic diagram of the supervisory control equipment used at a substation in conjunction with the dispatching office equipment of Fig. 1d;

Figure 1A:
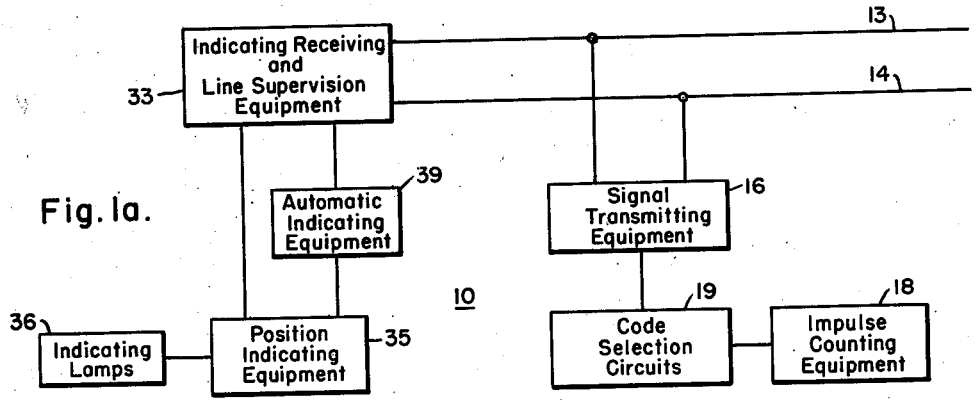
Fig. 1a is a schematic diagram of the supervisory control equipment at the dispatching office of a supervisory control system embodying the invention in one of its forms.
Figure 1B:
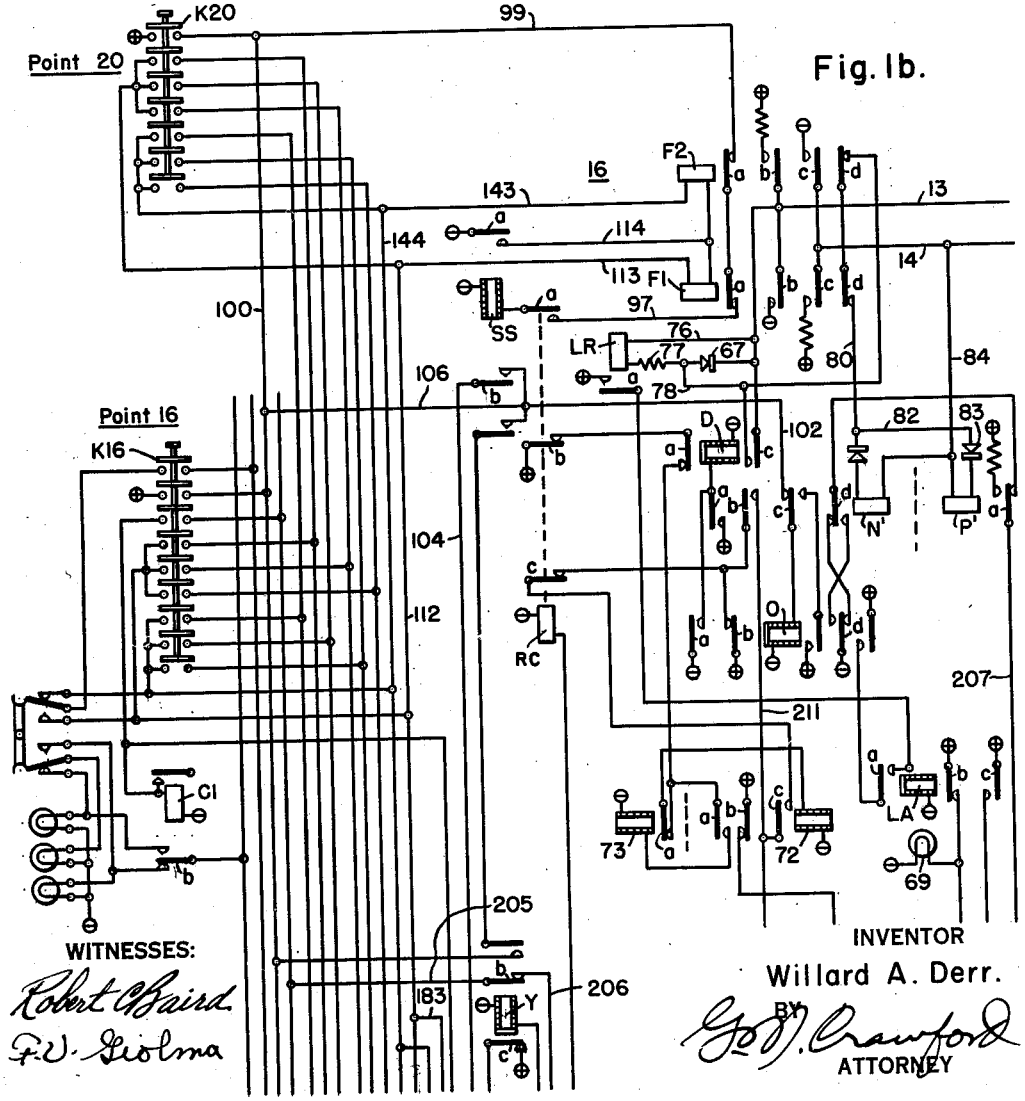
Fig. 1b is a diagrammatic view of the supervisory control equipment shown schematically in Fig. 1a, with the exception of the impulse counting relays and a portion of the selection code circuits.
Figure 2A:
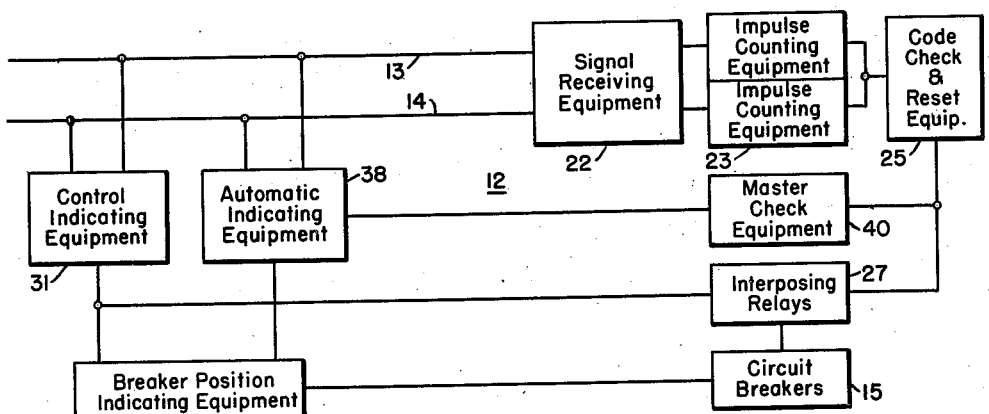
Figure 2B:
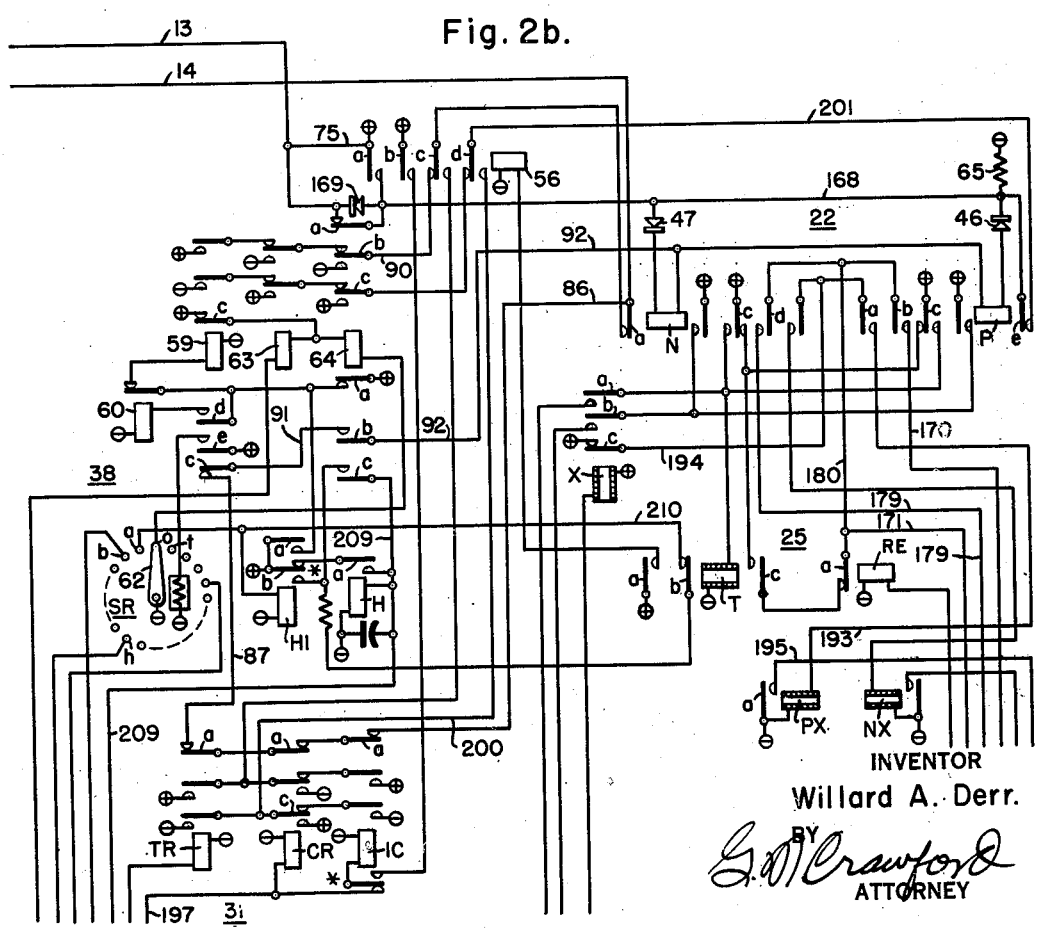
Fig. 2b is a diagrammatic view of the supervisory control equipment shown schematically in Fig. 2a, with the exception of the impulse counting relays, the master check relay, the breaker interposing relays, and the breaker position indicating relays.
Figure 2C:
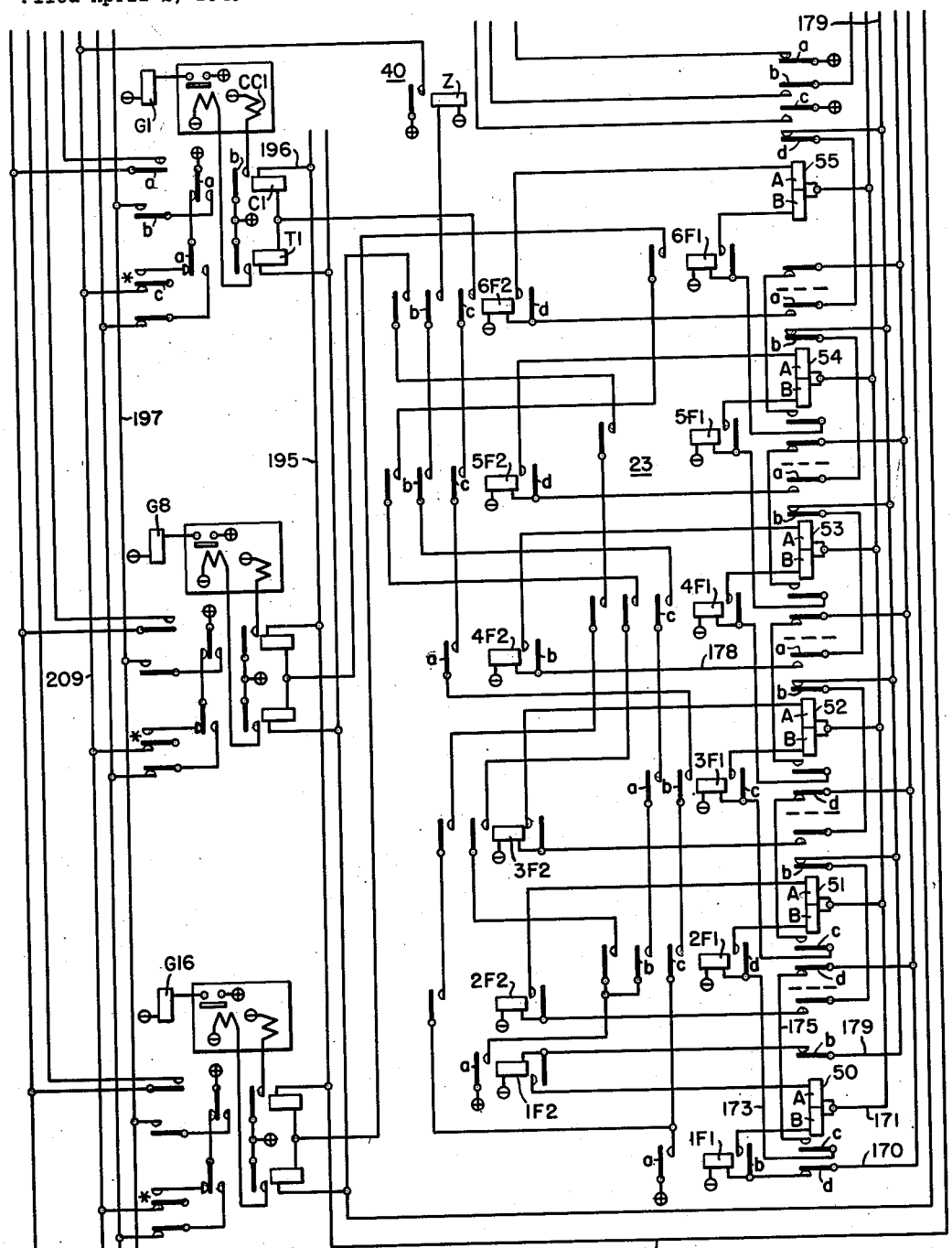
Figure 1D:
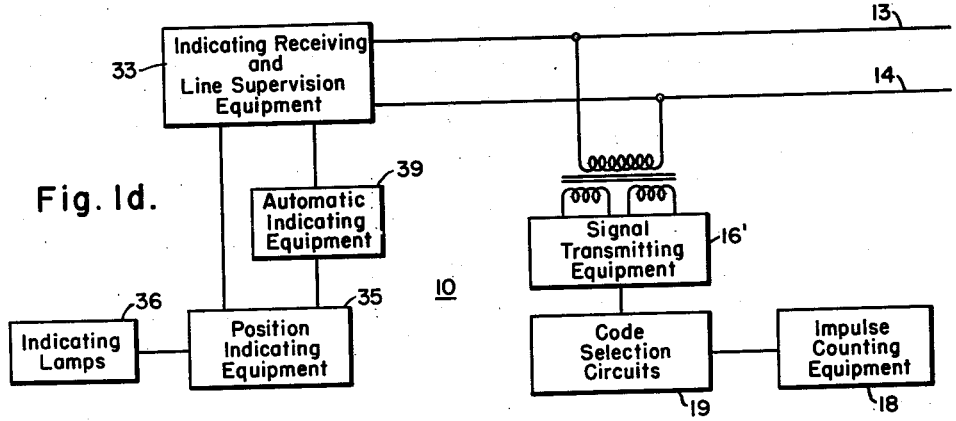
Fig. 1d is a schematic diagram of the supervisory control equipment at the dispatching office in a system embodying the invention in a different form.
Figure 1E:
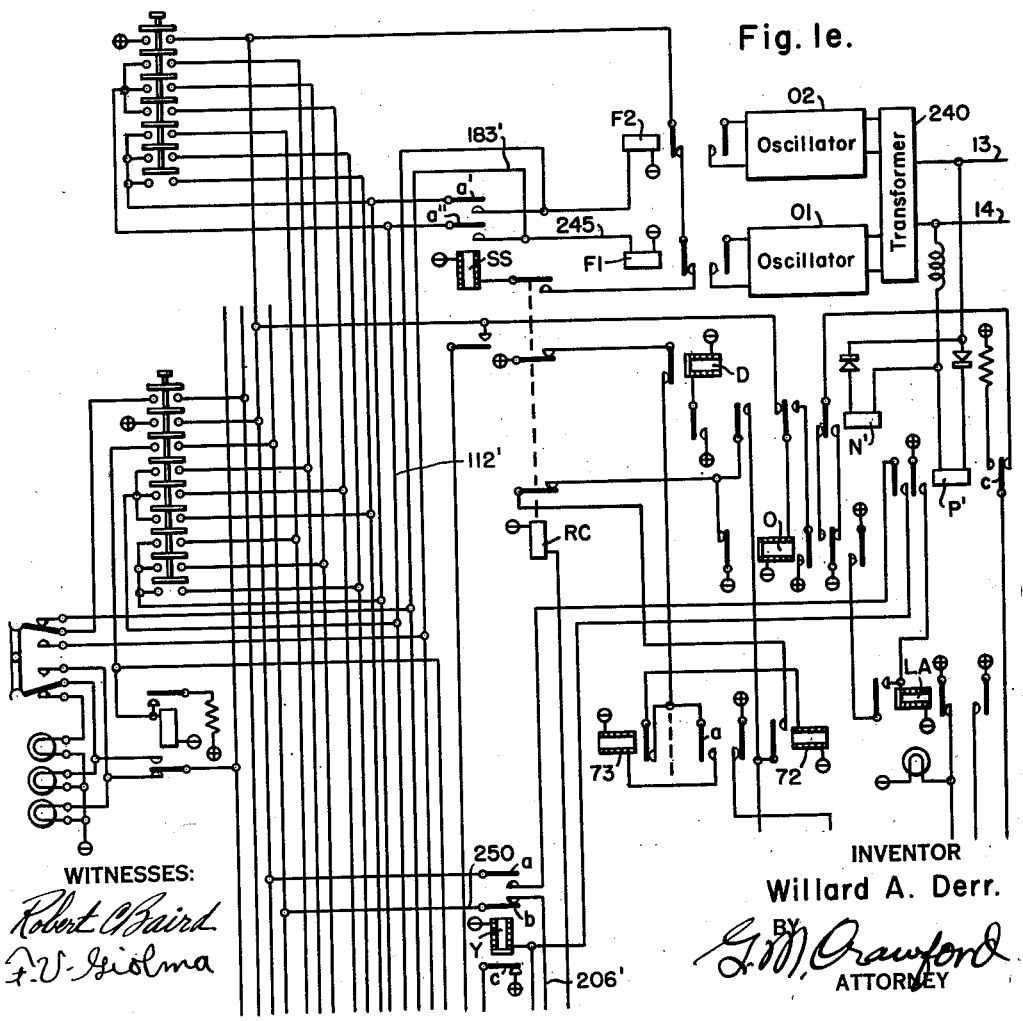

Fig. 1e is a diagrammatic view of dispatching office supervisory control equipment disposed to be used in conjunction with Fig. 1c, to complete a diagrammatic view of the equipment shown schematically in Fig. 1d; and Fig. 2e is a schematic diagram of supervisory control equipment disposed to be used in conjunction with the equipment of Fig. 2c to complete a diagrammatic view of the substation equipment shown schematically in Fig. 2d.

Referring to Figs. 1a and 2a, the reference numeral 10 may denote generally supervisory control equipment at a dispatching office, which may be connected with supervisory control equipment 12 at a remote substation by means of a signalling channel comprising line conductors 13 and 14, for controlling and supervising the operation of apparatus units such as circuit breakers 15 at the substation. While this embodiment of the invention is shown as used with line conductors, the invention is not limited to such, and the term channel as used herein is intended to include carrier frequency, radio and other wave propagation means, as well as line conductors.

At the dispatching office, signal transmititng equipment 16 may be provided for applying to the line conductors 13 and 14 impulses of opposite polarities in different arrangements or patterns, which may be determined by impulse counting equipment 18, which operate in sequence to effect selective operation of the signal transmitting equipment, as determined by a plurality of code selection circuits 19, which may include point selection keys associated with each of the breakers to be controlled at the substation.

At the substation, signal receiving equipment 22 may be provided, which is selectively responsive to the polarity of the impulses applied to the line conductors 13 and 14. These impulses may be counted by means of impulse counting equipment 23, which may be selectively controlled by the signal receiving equipment 22. Code check and reset equipment 25 operates if there are more than or less than a predetermined number of impulses to reset the system so as to prevent a false operation. The impulse counting equipment 23 operates selectively in response to the operation of the signal receiving equipment 22 to complete operating circuits for breaker interposing relays 27, which control the operation of whichever of the breakers 15 may be associated therewith. Breaker position indicating equipment 30, including relays associated with each circuit breaker, effect operation of one or the other of a pair of relays of control indication equipment 31 to apply either a positive or a negative potential to the signalling channel to indicate the position of the selected breaker.

At the dispatching office, indication receiving and line supervision equipment 33 is provided for controlling the operation of position indicating equipment 35, which selectively energize indicating lamps 36 to indicate the position of the selected circuit breaker, and for supervising the signalling channel.

At the substation, automatic indication equipment 38 is provided, which is controlled by the circuit substation breaker position indicating equipment to operate and effect synchronous operation of automatic indicating equipment 39 at the dispatching office to check the position of each of the breakers in the event that one of them opens automatically.

Master check equipment 40 is provided at the remote substation for operation in response to the transmission of a master check code from the dispatching office to effect operation of the automatic indication equipment 38 for checking the position of each circuit breaker.

Referring to Figs. 1b and 1c, it will be seen that the signal transmitting equipment 16 at the dispatching office may comprise a pair of signal transmitting relays F1 and F2 for selectively connecting the line conductors 13 and 14 to a source of direct current so that either the conductor 13 is positive or the conductor 14 is positive. Operation of the transmitting relays F1 and F2 may be controlled by means of a plurality of impulse counting relays represented generally by the numeral 18, and which may comprise a chain of counting relays S1 through S6.

A plurality of sequence relays 41, 42 and 43 may be provided in conjunction with the counting relays for setting up circuits for different ones of the counting relays, in sequence. A driving impulse relay SS of the delayed dropout type may be utilized for operation in response to operation of either of the transmitting relays F1 and F2, for connecting the impulse counting relays S1 through S6 and sequence relays 41 through 43 to a source such as a dispatching office battery for effecting operation thereof.

For each circuit breaker to be controlled at the remote substation, an individual control point is provided at the dispatching office for setting up the selection code circuits 19. Since the equipment individual to these control points will be substantially identical, only the equipment at point 1 will be described in detail, although the equipment for points 8 and 16 are also shown, for the purposes of illustration.

Referring to Fig. 1c, it will be seen that each point may be provided with a point selection key, such as the spring return type key K1, for controlling the code selection circuits 19 through which the transmitting relays F1 and F2 may be selectively controlled by the impulse counting relays S1 through S6. Each control point may also be provided with a control key of the twist type, such as the key CK1, which may be operated either to the "close" or "trip" position for determining the transmission of a control code for operating the breaker associated with the particular control point.

In conjunction with the point selection key K1 and the control key CK1, a red "closed" lamp R, a white "disagreement" lamp W, and a green "open" lamp G may be provided for indicating the position of the associated breaker. A position indicating relay 45 may be provided in conjunction with the lamps at the control point 1 for indicating the position of breaker #1 at the remote substation.

Referring to Figs. 2b and 2c, it will be seen that the signal receiving equipment 22 at the substation may comprise receiving relays P and N having rectifier devices 46 and 47 in circuit relation therewith so as to make them selectively responsive to the application of positive impulses to the line conductors 14 and 13, respectively.

In order to provide for counting the impulses applied to the receiving relays P and N, a plurality of impulse counting relays, designated generally by the numeral 23, may be provided at the substation. These counting relays may, for example, comprise one chain of counting relays 1F1, 2F1, 3F1, 4F1, 5F1 and 6F1, disposed to be controlled by the receiving relay P, and a second chain of counting relays 1F2, 2F2, 3F2, 4F2, 5F2 and 6F2 disposed to be controlled by the receiving relay N.

These two chains of counting relays may be provided with a plurality of common sequence relays 50, 51, 52, 53, 54 and 55, having A and B operating windings on each relay, the A winding being disposed to be energized in series circuit relation with its associated counting relay controlled by the receiving relay N, and the B winding being disposed to be energized in series circuit relation with the corresponding counting relay of the chain controlled by the receiving relay P.

At the remote substation the code check and reset equipment, designated generally by the numeral 25, may comprise an undercount reset relay T, which is essential to operation of the counting chains. Relay T may be of the delayed dropout type and disposed to be operated any time either of the receiving relays P and N operates. An energizing circuit may be provided for the relay T through a front contact of the sequence relay 55 so as to provide for deenergizing relay T in the event that the sequence relay 55, which is picked up at the end of the normal code sequence, does not operate. An overcount release relay RE may be provided for deenergizing the counting chain relays and resetting the substation equipment in the event that more than the predetermined number of impulses are received. Energization of the relay RE may be provided in the event that either of the receiving relays P or N is again energized after the sequence relay 55 has picked up at the end of the sequence and before the control set-up relay X drops out. A line transfer relay 56 disconnects the substation battery from the line conductors to remove line supervision on the receipt of a signal.

Operation of the counting chain relays 1F1 through 6F1 and 1F2 through 6F2 sets up an operating circuit for the interposing relays of the selected breaker. Since the control equipment at each of the breaker locations is substantially the same, only that for the #1 circuit breaker will be described in detail, although the control equipment for breaker #8 and breaker #16 is shown for purposes of illustration.

Each of the breakers, for example, breaker #1, may be provided with a breaker position indicating relay G1, a "close" interposing relay C1 and a "trip" interposing relay T1. In order to provide for insuring energization of the "trip" and "close" relays for a sufficient time to insure proper operation of the breaker, auxiliary control relays PX and NX may be provided for selectively connecting either the "close" relay C1 or the "trip" relay T1 to a substation battery, depending upon whether a positive or a negative control pulse is sent subsequent to completion of the point selection code.

At the substation, manual indication control relays, represented generally by the numeral 31, may be provided for indicating at the dispatching office a change in breaker position in response to the transmission of a control code from a dispatching office. These control relays may, for example, comprise a trip indication relay TR and a close indication relay CR, which may be disposed to selectively connect the line conductors 13 and 14 to negative and positive, respectively, and vice versa. A trip-free indication relay IC may be provided for setting up an energizing circuit for the line conductors so as to obtain a green light indication at the dispatching office in the event of a trip-free operation when a breaker is closed on a fault.

At the dispatching office, as shown in Fig. 1b, indication receiving relays P' and N' may be provided, which may be selectively responsive to the application of positive and negative potentials to the conductor 13, respectively. These relays may be connected so as to either energize or shunt down the respective position indicating relays, represented by the relay 45, depending on which circuit breaker is being controlled, and thereby control the energization of the associated lamps R, W, and G.

At the substation, the automatic indication equipment, designated generally by the numeral 38, may comprise a pair of automatic start relays H and H1 which may operate in response to the change in position of one of a plurality of breaker position indicating relays G1 through G20, represented in Fig. 2c by the relays G1, G8 and G16, to effect energization of a pair of driving relays 59 and 60 for operating a stepping relay SR, having an arm 62 disposed to sequentially engage a plurality of stationary contacts o, and a, b, etc. through t. The stepping relay SR may be disposed to control the energization of an automatic indication control relay 63 in successive positions for each of the circuit breakers at the remote substation, depending on whether the auxiliary switch *a* of the breaker is open or closed.

As the arm 62 engages the different contact members, such as the contact member *a*, associated with breaker 1, and the contact member *h* associated with the breaker #8, the driving relay 59 applies positive polarity to the conductor 14 each time it operates to step the relay SR. A corresponding stepping relay SRD may be provided at the dispatching office which will be energized each time the relay SR at the substation operates. Accordingly, the two stepping relays operate in synchronism, and the stepping relay SRD at the dispatching office is enabled to either pick up or shunt down the position indicating relays of the different points at the dispatching office such as, for example, relay 45, depending on whether the relay IC at the remote substation is energized or not. An automatic sending control relay 64 is energized through the arm 62 in its normal position to deenergize the driving relays.

At the dispatching office a line supervision relay LR may be connected in series circuit relation with the line conductors 13 and 14 for operation in response to the application of a positive potential to the line conductor 13 from the substation by the control relay 64, through a current limiting resistor 65. A rectifier device 67 may be connected in circuit relation with the line relay LR so as to effectively connect the line relay in the circuit with the indicating receiving relay P' and provide a by-pass for the relay N'. A line supervision control relay LA of the delayed dropout type may be provided in conjunction with the line supervision relay LR for controlling the energizing of a line supervision lamp 69. A bell 70 may be provided in conjunction with an alarm relay AL for indicating an automatic operation, and a lamp relay LC may be provided for controlling the energization of all of the indicating lights at the dispatching office.

In the event that the stepping relay SRD at the dispatching office should fail to return to its initial or normal position on contact *o*, reset may be effected by means of a pair of reset stepping relays 72 and 73 which may be controlled by a receiving control relay RC which is disposed to be energized when the stepping relay SRD returns to its normal position as shown.

At the substation the master check equipment 40 may comprise a master check relay Z for initiating operation of the stepping relay SR at the remote substation to check the position of all the breakers in response to the receipt of a "check" code.

With the equipment at rest, the dispatching office relays LR, LA, LC and RC will be in the energized position as well as any position indicating relay of a circuit breaker which may be closed. At the substation the control set-up relay X and the automatic sending control relay 64 will be energized, as well as any of the breaker position indicating relays G1, etc., of a circuit breaker which may be closed.

Referring to Figs. 1b and 2b, it will be seen that the line conductor 13 is connected to the positive terminal of the substation battery through conductor 75, so that an energizing circuit is provided for the line supervision relay LR at the dispatching office. This circuit extends from positive through conductors 75, 13 and 76, operating winding of line relay LR, resistor 77, conductor 78, armature *d* of transmitting relay F2, armature *d* of transmitting relay F1, conductors 80 and 82, rectifier device 83, operating winding of the receiving relay P', conductor 84, line conductor 14, conductor 86, back contact and armature *a* of the trip-free indicating relay IC, back contact and armature *a* of the manual indication control relay CR, armature *a* and back contact of the manual indication control relay TR, conductor 87, back contact and armature *c* of the driving relay 59, conductor 91, front contact and armature *b* of the automatic sending control relay 64, conductor 92, the operative winding of the receiving relay P, rectifier device 46 and resistor 65 to negative.

In the event of a fault on the line conductors, the line relay LR will drop, interrupting the energizing circuit for the line supervision control relay LR at armature *a* of the line supervision relay LR, thereby providing obvious energizing circuits for the line supervision lamp 69 and the alarm 70, through armatures *b* and *c* of the line supervision control relay LA. The alarm 70 may be cut out by opening an alarm switch 93.

Should the operator desire to close the circuit breaker associated with control point #1, at the remote substation, he turns the circuit breaker control key CK1 to the "close" position as shown. This moves armatures *a* and *b* from the outer to the inner contacts, providing an energizing circuit for the white disagreement lamp W extending from negative through the lamp W, armature *b* and the inner contact of CK1, through back contact and armature *b* of the position indicating relay 45, conductors 94 and 95 and front contact and armature *a* of the master lamp relay LC to positive. Operation of the control key CK1 also sets up a control circuit, which will be traced at a later point, for sending the "close" operating code when the breaker point has been selected.

The spring return point selection key K1 associated with breaker #1 is then operated and held in the operated position. A circuit is thereby provided for the driving impulse relay SS, extending from negative through the operating winding of the relay SS, armature *a* and front contact of the receiving control relay RC, conductor 97, back contact and armature *a* of the transmitting relay F1, armature *a* and back contact of the transmitting relay F2, conductors 99 and 100 and contact member *b* of the point selection key K1 to positive. At the same time, an operating circuit is provided for the sending and receiving transfer relay O, extending from negative through the operating winding of the relay, armature *c* and back contact of the receiving relay N', conductor 102, to conductor 100 and contact member *b* of the point selection switch K1 to positive.

At the same time, an operating circuit is provided for the sending and receiving transfer relay O, extending from negative through the operating winding of the relay, armature *c* and back contact of the receiving relay N', conductor 102, to conductor 100 and contact member *b* of the point selection switch K1 to positive.

The sending and receiving transfer relay O operates to interrupt the energizing circuit of the stepping relay SRD at armature *b*, so as to prepare for manual control indication, and energizes the reset control relay D through armature *a*. The relay D shunts the rectifier device 67 at armature *c* to connect the relays P' and N' for receiving an operation indication. The driving impulse relay SS energizes the first relay of the counting chain, namely, relay S1, through a circuit extending from negative through the operating winding of counting relay S1, conductor 103, back contact and armature b of sequence relay 41, back contact and armature b of sequence relay 42, back contact and armature c of sequence relay 43, conductor 104, armature b and front contact of relay SS, conductors 106 and 100, and contact member b of point selection switch K1 to positive.

The operation of counting relay S1 energizes the transmitting relay F1 over an energizing circuit extending from positive through armature c and back contact of sequence relay 41, armature a and front contact of counting relay S1, conductors 108 and 110, contact member d of point selection switch K1, conductors 112 and 113, operating winding of transmitting relay F1, conductor 114 and front contact and armature a of the driving impulse relay SS to negative. Relay F1 operates to connect positive battery potential to line conductor 14 through armature c and negative battery potential to line conductor 13 through armature b.

When the transmitting relay F1 operates, it also opens the circuit of the driving impulse relay SS at armature a. Deenergization of relay SS interrupts the energizing circuit of the transmitting relay F1 at armature a of the relay SS, thus removing potential from the line conductors.

Deenergization of the driving impulse relay SS also removes a shunt circuit from around the sequence relay 41, which thereupon picks up in series circuit relation with the counting relay S1. This circuit extends from negative through the operating winding of the counting relay S1, armature c and front contact of counting relay S1, conductor 120, operating winding of sequence relay 41, back contact and armature c of sequence relay 42, conductors 121 and 100, and contact member b of point selection switch K1 to positive. The original energizing circuit for the counting relay S1 will be interrupted by the opening of armature b of the sequence relay 41 from its back contact.

When the transmitting relay F1 releases, it again completes an energizing circuit for the driving impulse relay SS at armature a. Energization of the relay SS now completes an energizing circuit for the second of the counting relays S2. This circuit extends from negative through the operating winding of relay S2, conductor 123, front contact and armature b of relay S1, conductor 124, front contact and armature b of sequence relay 41, back contact and armature b of sequence relay 42, back contact and armature c of sequence relay 43, conductor 104, armature b and front contact of the driving impulse relay SS, conductors 106 and 100, and contact member b of the point selection key K1 to positive.

Operation of counting relay S2 completes a circuit for energizing the transmitting relay F1, extending from positive through armature d and back contact of sequence relay 42, armature a and front contact of counting relay S2, conductors 127 and 128, contact member e of point selection key K1 and conductor 112 over the circuit previously traced in connection with the initial energization of relay F1.

Operation of the transmitting relay F1 again applies positive battery potential to line conductor 14 and negative battery potential to line conductor 13. Operation of the transmitting relay F1 also again interrupts the energizing circuit of the driving impulse relay SS which returns to the deenergized position removing a shunt from the sequence relay 42. The sequence relay 42 thereupon picks up in series circuit relation with the counting relay S2 over a circuit extending from negative through the operating winding of counting relay S2, armature c and front contact of relay S2, conductor 129, operating winding of sequence relay 42, back contact and armature d of sequence relay 43, conductors 130, 121 and 100, and contact member b of the point selection key K1 to positive. Operation of sequence relay 42 interrupts the energizing circuit for the series arrangement of relays S1 and 41.

An energizing circuit is now provided for the third of the counting relays S3, extending from negative through the operating winding of the counting relay S3, conductor 131, front contact and armature b of counting relay S2, conductor 133, front contact and armature b of sequence relay 42, back contact and armature c of sequence relay 43, and conductor 104 through armature b and front contact of the driving impulse relay SS, over the circuit previously traced. Counting relay S3 completes an energizing circuit for the transmitting relay F1, from positive through armature e of sequence relay 43, armature a and front contact of counting relay S3, conductors 135 and 136, contact member f of the point selection key K1, conductor 112 and the transmitting relay F1 over the same circuit as hereinbefore described.

Operation of the transmitting relay F1 again interrupts the energizing circuit for the driving impulse relay SS, so that the sequence relay 43 picks up in series circuit relation with the counting relay S3 through armature c and its front contact and armature d and the back contact of sequence relay 41. Operation of sequence relay 43 interrupts the energizing circuit for relays S2 and 42 at armature d of relay 43.

When the driving impulse relay SS is deenergized, it interrupts the energizing circuit for the transmitting relay F1. An energizing circuit is thereupon provided for the fourth of the counting chain relays S4, extending from negative through the operating winding of the relay S4, conductor 140, front contact and armature b of the counting relay S3, conductor 141, front contact and armature c of sequence relay 43 and conductor 104 through armature b and front contact of the impulse driving relay SS to positive at contact member b of point selection key K1.

Operation of counting relay S4 provides an energizing circuit for the transmitting relay F2, extending from negative through armature a and front contact of the relay SS, conductor 114, operating winding of transmitting relay F2, conductors 143, 144 and 145, contact member g of point selection key K1, conductor 147, front contact and armature a of counting relay S4, conductor 148, and back contact and armature c of sequence relay 41 to positive.

When relay F2 operates it applies positive battery potential to line conductor 13 through armature b, and negative battery potential to line conductor 14 through armature c. Transmitting relay F2 also interrupts the energizing circuit for the driving impulse relay SS at armature a. Relay SS deenergizes and interrupts the energizing circuit for the transmitting relay F2 at its own armature a.

Deenergization of the impulse driving relay SS again removes a shunt from around the sequence relay 41 which is now energized in series circuit relation with the counting relay S4, through armature c and front contact of relay S4, conductors 151 and 120, operating winding 41 and armature c of sequence relay 42, to positive at contact member b of point selection key K1.

When the transmitting relay F2 deenergizes, it again completes an energizing circuit for the impulse driving relay SS, which operates to complete an energizing circuit for the fifth of the counting relays S5. This circuit extends from negative through the operating winding of relay S5, front contact and armature b of relay S4, conductors 153 and 124, and front contact and armature b of sequence relay 41 to positive through contact member b of the point selection key K1 as described originally for counting relay S2.

Counting relay S5 completes a circuit for transmitting relay F2 through armature a and front contact of the counting relay, conductor 156, contact member h of point selection key K1, and conductor 145 to transmitting relay F2, as hereinbefore described. Again, operation of relay F2 interrupts the energizing circuit for the driving relay SS and sequence relay 42 picks up in series circuit relation with the counting relay S5 through armature c and front contact of the counting relay, interrupting the circuit of relays S4 and 41 at armature c.

Relay SS is again energized when the transmitting relay F2 deenergizes, and completes an energizing circuit for the last of the counting relays S6, extending from negative through the operating winding of relay S6, front contact and armature b of relay S5, conductors 159 and 133, and through front contact and armature b of the sequence relay 42 over the same circuit traced for the counting relay S3.

Operation of counting relay S6 completes an energizing circuit for the transmitting relay F2, extending from positive through armature e and back contact of sequence relay 43, conductors 161 and 162, armature b and front contact of relay S6, conductors 163 and 164 through contact member i of the point selection key K1 to the operating winding of the transmitting relay through conductor 145 and the circuit as previously traced.

Operation of transmitting relay F2 again applies positive battery potential to line conductor 13 and negative battery potential to line conductor 14. Operation of the transmitting relay F2 again deenergizes the driving impulse relay SS and provides for energizing the sequence relay 43 in series circuit relation with the counting relay S6 through contact member c of relay S6. The circuit for relays S5 and 42 is interrupted at armature d of relay 43.

Energization of sequence relay 43 interrupts the energizing circuit of the control code relay Y, which is of the long-delayed dropout type and provides for sending a control code impulse after a predetermined time, the polarity of which is determined by the operating position of the control code twist key CK1.

It will be obvious from an examination of Figs. 1b and 1c that if the point selection key K8 were depressed instead of key K1, selection code circuits would be set up for operating the signal transmitting relays F1 and F2 in the following pattern: F1, F2, F2, F1, F1, F2. If key K16 were depressed, the pattern would be F2, F1, F2, F1, F2, F1. For the master check key at point 20, the pattern is F2, F1, F1, F1, F2, F2.

Referring to Figs. 2b and 2c, it will be recalled that on the initial operation of the transmitting relay F1, line conductor 13 was connected to the negative battery terminal while line conductor 14 was connected to the positive battery terminal.

Accordingly, an energizing circuit was provided for the receiving relay P, extending from line conductor 14 through conductor 86, back contact and armature a of the trip-free indicating relay IC, back contact and armature a of the manual indication control relay CR, armature a and back contact of the manual indication control relay TR, conductor 87, back contact and armature c of the driving relay 59, conductor 91, front contact and armature b of the automatic sending control relay 64, conductor 92, operating winding of the receiving relay P, rectifier device 46, conductor 168 and rectifier device 169 to line conductor 13. Receiving relay P operates and provides an energizing circuit for the undercount release relay T through armature c and its front contact. Relay T provides an obvious energizing circuit for the line transfer relay 56 through armature a and its front contact, so that the line transfer relay operates to disconnect the substation battery from the line conductors.

As the same time the operation of receiving relay P provides an energizing circuit for the first of the positive counting relays 1F1, extending from negative through the operating winding of relay 1F1, back contact and armature d of sequence relay 50, conductor 170, front contact and armature b of relay P, armature a and back contact of the overcount release relay R, armature c and front contact of the undercount release relay T, and back contact and armature c of the receiving relay N to positive.

Upon the termination of the first impulse, receiving relay P deenergizes, and the lower operating winding B of the sequence relay 50 will thereupon be energized in series circuit relation with the operating winding of the counting relay 1F1, through a circuit extending from negative through the operating winding of the relay 1F1, armature b thereof and its front contact, the lower operating winding B of relay 50, conductor 171 to armature a of the overcount release relay R and to positive through the same circuit previously traced for the relay 1F1.

Upon the second operation of the transmitting relay F1, the receiving relay P is again energized over the same circuit and completes an energizing circuit for the second of the positive counting relays 2F1, through a circuit extending from negative through the operating winding of the relay 2F1, conductor 173, armature c and front contact of sequence relay 50, conductor 175, back contact and armature d of sequence relay 51 and conductor 170 to battery positive over the same circuit traced for relay 1F1.

When the receiving relay P drops at the termination of the second impulse, the lower operating winding B of the sequence relay 51 will be energized in series circuit relation with the operating winding of the counting relay 2F1, over a circuit extending through armature d and its front contact and conductor 171 to positive.

The third operation of transmitting relay F1 results in a third operation of the receiving relay P, thus completing an energizing circuit for the third positive counting relay 3F1, through armature c and front contact of sequence relay 51, and back contact and armature d of sequence relay 52. Upon termination of the third pulse, the receiving relay P deenergizes and sequence relay 52 operates, its lower operating winding B being connected in series circuit relation with the operating winding of positive counting relay 3F1, through armature c and front contact of relay 3F1 to conductor 171 and battery positive.

The fourth impulse being of reverse polarity, receiving relay N will be energized over a circuit extending from conductor 13, through conductor 75, armature a and front contact of line transfer relay 56, conductor 168, rectifier device 47, operating winding of relay N, conductor 92, armature b and front contact of relay 64, conductor 94, armature c and back contact of relay 59, conductor 87, back contact and armature a of relay TR, armature a and back contact of relay CR, armature a and back contact of relay IC and conductor 86 to line conductor 14. This provides an energizing circuit for the fourth one of the negative counting relays, relay 4F2, since operation of the sequence relays 50, 51 and 52 interrupts the energizing circuit for the negative counting relays 1F2, 2F2 and 3F2, at armature b of relay 50, armature b of relay 51 and armature b of relay 52, respectively.

The energizing circuit for delay 4F2 extends from negative through the operating winding of relay 4F2, conductor 178, front contact and armature a of sequence relay 52, armature b and back contact of sequence relay 53, conductor 179, front contact and armature d of receiving relay N, conductor 180, armature a and back contact of the overcount release relay R, armature c and front contact of the undercount release relay T, and back contact and armature c of the receiving relay P.

Upon termination of the fourth impulse, sequence relay 53 is energized in series circuit relation with the negative counting relay 4F2 through a circuit extending over armature b, the upper operating winding A of relay 53 and conductor 171 to battery positive over the same circuit previously traced for relays 52 and 3F1.

The following operation of transmitting relay F2 again energizes the transmitting relay N, and an energizing circuit is completed for the fifth one of the negative counting release relays 5F2. This circuit may be traced from the relay 5F2 through front contact and armature a of the sequence relay 53, and armature b and back contact of the sequence relay 54 to conductor 179 and thence to battery positive.

Upon termination of the fifth impulse, the receiving relay N deenergizes, and sequence relay 54 picks up, the upper operating winding A being connected in series circuit relation with the operating winding of the counting relay 5F2 through armature d and front contact of the relay 5F2, the upper operating winding A of the sequence relay 54 to conductor 171 and battery positive.

The final operation of the transmitting relay F2 again results in energization of the receiving relay N, which this time provides an energizing circuit for the sixth of the negative counting relays 6F2, extending through front contact and armature a of the sequence relay 54, and armature d and back contact of the sequence relay 55 to positive over the circuit previously traced for relay 5F2.

Upon deenergization of receiving relay N, sequence relay 55 operates, its upper operating winding A being connected in series circuit relation with the operating winding of the counting relay 6F2 through armature d of the counting relay 6F2 and front contact to conductor 171 and thence to positive battery. Operation of sequence relay 55 interrupts the energizing circuit of the control set-up relay X at armature a. An energizing circuit for the overcount release relay RE is set up through armature b and front contact of the sequence relay 55, and front contact and armature b of relay X to front contact and armature b of relay N. An energizing circuit is also provided for the undercount release relay T through armature c and front contact of relay 55, and front contact and armature a of relay X to prevent the relay T from releasing the supervisory control equipment.

At the dispatching office the control code control relay Y deenergizes after a predetermined time delay and completes an energizing circuit for the transmitting relay F1, extending from negative through armature a of the driving impulse relay SS, conductor 114, operating winding of relay F1, conductors 113, 112 and 183, inner contact and armature a of the twist control key CK1, conductor 185, contact member a of the point selection key K1, conductor 187, front contact and armature a of the counting relay S6, conductor 188, front contact and armature f of sequence relay 43, conductor 190 and armature c and back contact of the control code control relay Y, to battery positive. Transmitting relay F1 operates to connect the line conductors 13 and 14 to the dispatching office battery and transmit a positive impulse for closing the circuit breaker #1.

At the remote substation, receiving relay P operates in response to the positive impulse and provides an energizing circuit for the auxiliary receiving relay PX, extending from negative through the operating winding of relay PX, conductor 193, front contact and armature a of relay P, conductor 194, and armature c and back contact of control set-up relay X to battery positive.

Prior to operation of relay P, however, an operating circuit was set up for either the "close" or "trip" interposing relays C1 and T1 of breaker #1, through a circuit extending from positive through armature a and front contact of counting relay 1F1, armature c and front contact of counting relay 2F1, armature b and front contact of counting relay 3F1, armature a and front contact of counting relay 4F2, armature c and front contact of counting relay 5F2, and armature c and front contact of counting relay 6F2 to the interposing relays.

Operation of relay PX connects negative battery to the "close" interposing relay C1, through a circuit extending from negative through armature a of relay PX and front contact, conductors 195 and 196 to the operating winding of relay C1. Relay C1 operates and connects the closing coil CC1 of the breaker #1 to the substation battery.

Operation of "close" relay C1 provides an energizing circuit for the manual control indication relay CR, extending from negative through the operating winding of the relay CR, conductor 197, front contact and armature b of the breaker position indicating relay G1, and front contact and armature a of the relay C1. Operation of the automatic indication relays is prevented by interrupting the energizing circuit therefor at the back contact of armature a of relay C1. Operation of relay CR connects positive battery to line conductor 13 through armature c and its front contact, conductor 200, front contact and armature d of line transfer relay 56, conductor 201, back contact and armature e of the receiving relay P and conductor 168 and rectifier device 169 to conductor 13.

The trip-free indication relay IC is energized in parallel circuit relation with the relay CR through its own armature c and its "make-before-break" contacts, and sets up an energizing circuit for connecting the line conductors 13 and 14 to negative and positive through armatures a and b, respectively. In the event that the breaker trips free, relay CR will be deenergized at armature b of relay G1, and will complete the energizing circuit for the line conductors through armatures a and b and their back contacts. Receiving relay N' will therefore be energized to shunt down the position indicating relay 57 over a circuit through conductor 203, contact c of K1, conductor 204, conductor 205, armature b of relay Y, conductor 206, armature a of relay 43, conductor 207, armature a and back contact of relay P', armature d and front contact of relay N' and armature d and front contact of relay O to negative. Relay C1 lights the green lamp G and indicates the open breaker, even though the automatic equipment may be blocked by the breaker interposing relay G1.

At the dispatching office the receiving relay P' will be energized through a circuit extending from conductor 13 through armature c and front contact of the reset control relay D, conductor 78, back contact and armature d of relay F2, armature d and back contact of relay F1, conductors 80 and 82, rectifier device 83, operating winding of relay P' and conductor 84, back to the substation through line conductor 14.

Operation of receiving relay P' completes an energizing circuit for the position indicating relay 45 at point 1, extending from negative through the operating winding of relay 45, conductor 203, contact member c of point selection key K1, conductors 204 and 205, armature b and back contact of the control code control relay Y, conductor 206, armature a and front contact of sequence relay 43, conductor 207, armature a and front contact of receiving relay P' to battery positive. Relay 45 picks up and provides a holding circuit for itself through armature a and its front contact.

The white disagreement lamp W is extinguished by interruption of the circuit at armature b, and an energizing circuit is provided for the red lamp R from negative through the lamp R through front contact and armature b of the position indicating relay 45 through conductor 94 and conductor 95 and front contact and armature a of the master lamp relay LC.

Should the breaker #1 at the remote substation trip, due to operation of its protective relay, the breaker position indicating relay G1 will be deenergized. A momentary energizing circuit will thereupon be provided for the automatic start relay H, extending from negative through the operating winding of the relay H, conductor 209, armature c and its make-before-break contact of relay G1, back contact and armature a of the "trip" interposing relay T1, and back contact and armature a of the "close" interposing relay C1. Auxiliary start relay H1 will be energized in parallel with relay H through conductor 210, back contact and armature b of relay T, and armature c and front contact of the automatic sending control relay 64. Relay H1 provides a holding circuit for itself and relay H through armature b and its front contact. Relay H also establishes an energizing circuit for the drive relay 59 through front contact and armature a.

Operation of the drive relay 59 energizes the drive relay 60 through armature d and front contact, and deenergizes the automatic sending control relay 64 at armature c. Drive relays 59 and 60 thereupon proceed to operate sequentially, interrupting each other's energizing circuits, and relay H is deenergized at armature c of relay 64. Each time the relay 59 operates, it completes an obvious energizing circuit for the stepping relay SR at armature e and its front contact. Each operation of the relay SR moves the arm 62 from one contact to another in a counterclockwise direction. When the arm 62 energizes contact a, the relay H1 is shunted down.

When the stepping relay SR is energized a second time, the arm 62 energizes contact b, and sets up an energizing circuit for the automatic indication control relay 63. Since the breaker #1 has opened, the breaker position indicating relay G1 will be in the deenergized position and hence the energizing circuit for the automatic indication control relay 63 will be interrupted at armature a of relay G1. Accordingly, the control relay 63 will not be operated to apply battery potential to the line conductors 13 and 14.

Each time the drive relay 59 is energized to step the stepping relay SR, positive battery potential will be applied to line conductor 14 to energize the receiving relay N'2 at the dispatching office. Operation of the receiving relay N'2 completes an energizing circuit for the operating winding of stepping relay SRD at the dispatching office. This circuit extends from negative to the operating winding of the relay SRD through conductor 211, front contact and armature b of the receiving relay N'2, and back contact and armature b of the sending and receiving transfer relay O. Accordingly, the stepping relay SRD will step in synchronism with the stepping relay SR at the remote substation.

Since the automatic indication control relay 63 at the remote substation was not operated when the arm 62 energized contact member b, no potential will be applied to the line conductors, and both of the receiving relays P'1 and N'2 will be deenergized when arm 62 of the stepping relay SRD is on the corresponding contact b at the dispatching office. Accordingly, negative potential is applied to the operating winding of the position indicating relay 45 through a circuit extending from negative through the operating winding, through conductor 203, conductor 212, contact member b, arm 62, conductors 213 and 207, armature a and back contact of receiving relay P'1, armature d and back contact of receiving relay N', and back contact and armature d of sending and receiving transfer relay O. The position indicating relay 45 drops and completes an energizing circuit for the white disagreement lamp W and the green lamp G through armature b and its back contact, indicating that the breaker is open.

Relays 59 and 60 at the remote substation continue to operate and step both of the stepping relays SR and SRD. In the different positions of the relay SR in which an associated circuit breaker may be closed, the substation automatic indicating control relay 63 will be energized, and the line conductors will be connected to the substation battery so as to effect energization of the dispatching office receiving relay P'. At the dispatching office the energization of the receiving relay P' completes an energizing circuit for the position indicating relay connected to the particular contact point of the stepping relay SRD.

When the substation stepping relay SR reaches the initial position on contact member O, an energizing circuit is provided for the automatic sending control relay 64 through the contact arm 62 and armature c and back contact of the drive relay 59. Relay 64 interrupts the energizing circuit for relay 60 at armature d and stops the impulsing. Energization of relay 64 also reconnects the line conductors 13 and 14 to the substation battery through armatures b and c, to restore the signal line supervision circuit.

At the dispatching office the receiving control relay RC will be energized when the stepping relay SRD returns to the initial or O position. The reset control relay D deenergizes a relatively short time after the receiving relay N' returns to the deenergized position, since the energizing circuit therefor is interrupted at armature a.

In the event that the stepping relay SRD at the dispatching office does not end up in the initial position O, relay RC will remain deenergized. Accordingly, an energizing circuit is provided for the reset stepping relay 72 through armature a of the reset stepping relay 73, back contact and armature a of relay D, and armature b and back contact of the receiving control relay RC. Relay 72 picks up and completes an energizing circuit for the operating winding of the reset stepping relay 73 through armature a and its front contact, armature a and back contact of relay RC, and back contact and armature b of the receiving control relay D, thus stepping the relay SRD one point.

Relay 73 interrupts the energizing circuit of relay 72 at armature a. The energization of relay 73 restores the energizing circuit for relay 72 at armature a of relay 73, so that the relays 72 and 73 progressively step the relay SRD until it reaches the initial or O position, whereupon the receiving control relay A will be energized to restore the equipment to normal.

In the event the operator should desire to make a check of the operating position of the different breakers, he may depress a master check point selection key K20 at the dispatching office, which sets up code selection circuits for selectively operating the transmitting relays F1 and F2 in the following pattern: F2, F1, F1, F1, F2, F2. This operates the counting relays at the remote substation to set up an operating circuit for the master check relay Z through armature a of relay 1F2, armature b of relay 2F1, armature a of relay 3F1, armature c of relay 4F1, armature b of relay 5F2 and armature b of relay 6F2. Relay Z provides an operating circuit for the automatic start relay H through armature a, and each breaker position is then checked, as for an automatic operation.

Instead of utilizing apparatus such as described schematically in Figs. 1a and 2a of the drawings, wherein the signals transmitted comprise pulses of opposite polarities, apparatus may be utilized as shown in Figs. 1d and 2d wherein signal transmitting equipment 16' at the displatching office may be disposed to produce signals of two different frequencies, which may be, for example, audio frequencies. The signal receiving equipment 22' at the remote substation may be made selectively responsive to the different frequencies transmitted.

The impulse counting equipment 23 at the substation may be selectively responsive to operation of the signal receiving equipment 22' substantially as in the system of Figs. 1a and 2a. The number of impulses transmitted may be checked by code check and reset equipment 25 to determine whether the correct number of selection impulses has been sent before the operate code is transmitted. The impulse counting equipment 23 may operate to set up control circuits for the different interposing relays 27 of the circuit breakers 15 in exactly the same manner as in the system of Figs. 1a and 2a. Operation of the signal transmitting equipment 16' at the dispatching office may be controlled by means of selection code circuits 19 and impulse counting equipment 18 identical with those of the system of Figs. 1a and 2a.

Automatic operation of any of the breakers 15 may be indicated in the same manner as described in the system of Figs. 1a and 2a by utilizing the breaker position indicating equipment 30 to control operation of automatic indication equipment 38 to step automatic indication equipment 39 at the dispatching office and control the operation of the position indication equipment 35 and the energization of the indication lamps 36.

Master check equipment 40 may also be provided at the remote substation as in the system of Figs. 1a and 2a, for effecting operation of the automatic indication equipment 38 to check the breaker position indication equipment and lamps at the dispatching office in response to the transmission of a master check code from a dispatching office.

Referring to Figs. 1e and 1c, which together are a diagrammatic view of the supervisory control equipment at the dispatching office in the schematic arrangement of Fig. 1d, it will be seen that the transmitting relays F1 and F2, instead of changing the polarity of the line conductors 13 and 14 as in the system of Figs. 1b, 1c and 2b, 2c, may be disposed to key oscillators O1 and O2 which may in this instance be coupled to the line conductors through a transformer 240 for applying impulses of different frequencies to the line conductors.

The remainder of the equipment at the dispatching office is substantially identical with that shown in Fig. 1b, the equipment of Fig. 1c being, of course, common to the dispatching offices of the two systems. Accordingly, corresponding relays, conductors and other elements of the systems bear identical designations to those of the system of Fig. 1b.

Substantially the only circuit difference between the two systems, other than the use of different frequencies instead of different polarities, lies in the use of armatures a' and a'' of the driving impulse relay SS for controlling the operation of the transmitting relays F1 and F2, in place of the single armature a of Fig. 1b. This is because the driving impulse relay SS is not used in the present system to terminate the control code impulse, as was the case in the system described in connection with Fig. 1b, wherein the control code impulse was timed by the relay SS, so as not to interfere with the indication signal returned from the substation.

The receiving relays P' and N' may be connected to the line conductors 13 and 14 directly, for response to impulses of different polarities received from the remote substation, since these relays are not disposed to respond to the frequency signals produced by the transmitters O1 and O2.

At the remote substation receiving relays RR1 and RR2, instead of being connected directly to the line conductors 13 and 14 as were the relays P and N of Fig. 2b, may be connected thereto through receivers R1 and R2 which may be selectively responsive to the different frequencies transmitted by the oscillators O1 and O2. The receiving relays RR1 and RR2 may be utilized in substantially the same manner as described in connection with Fig. 2b for selectively operating the counting relays 23 for selectively setting up control circuits for selecting the different breaker points.

The code selection signal will be checked by the overcount release relay RE and the undercount release relay T in exactly the same manner as hereinbefore described, and upon termination of a predetermined time the control code control relay Y at the dispatching office deenergizes to complete an energizing circuit for either the transmitting relay F1 or the transmitting relay F2, depending on whether the control twist key CK1 has been operated to the "close" position as shown or to the "trip" position. With the twist key CK1 in the "close" position as shown, an energizing circuit will be set up for the transmitting relay F1, the same as traced hereinbefore in connection with the system of Figs. 1b and 1c.

Line supervision is obtained by normally connecting the line conductors 13 and 14 to the substation battery through armatures b and c of the line transfer relay 56, armatures a and b and front contacts of automatic sending control relay 64. This energizes receiving relay P' at the dispatching office and provides an obvious energizing circuit for the line supervision control relay LR, which is of the delayed dropout type, and holds up between code impulses. When it drops, it lights the lamp 69 and sounds the alarm 70 as described in connection with the system of Figs. 1b, 1c.

Should the operator desire to select the #1 breaker at the remote substation, he depresses the point selection key K1, and the counting chain relays 18 and sequence relays 41, 42 and 43 operate sequentially in the same manner as described in connection with the system of Figs. 1b and 1c to operate the transmitting relay F1 three times, and then the transmitting relay F2 three times. At the remote substation the receiver R1 energizes the receiving relay RR1 each time the oscillator O1 transmits an impulse signal of its particular frequency.

The receiving relay RR1 sequentially effects operation of the counting relays 1F1, 2F1 and 3F1 and their associated sequence relays 50, 51 and 52 in substantially the same manner as hereinbefore described in connection with the all direct current system of Figs. 1b, 1c and 2b, 2c. Subsequently, the receiver R2 operates the receiving relay RR2 three times, one for each of the impulses of frequency transmitted by the oscillator O2. The receiving relay RR2 effects sequential operation of the counting relays 4F2, 5F2, and 6F2 and their associated sequence relays 53, 54 and 55 in the same manner as described hereinbefore in connection with the operation of the direct current system.

The counting relays 1F1, 2F1, 3F1, 4F2, 5F2 and 6F2 set up an energizing circuit for the interposing relays C1 and T1 of breaker #1 through a circuit extending from positive through armature a of relay 1F1, armature c of relay 2F1, armature b of relay 3F1, armature a of relay 4F2, armature c of relay 5F2, and armature c of relay 6F2. This circuit is completed by operation of the receiving relay RR1 in response to the control code impulse transmitted when the control code control relay Y deenergizes at the end of the point selection code sequence to complete an energizing circuit for the transmitting relay F through a circuit which may be traced from negative through the operating winding of relay F1, conductor 245, conductor 183, inner contact and armature a of the control key CK1, conductor 185, contact member a of the point selection key K1, conductor 187, armature a and front contact of counting relay S6, conductor 188, front contact and armature f of sequence relay 43, conductor 190 and armature c, and back contact of relay Y to positive. The control code frequency F1 remains on the line conductors so long as the key K1 is depressed.

The relay RR1 at the substation operates in response to receipt of the control code frequency F1 and connects the interposing relay C1 to positive over the previously described circuit set up by the counting relays, and over through conductors 196 and 195', front contact and armature a of the receiving relay RR1 and armature e and back contact of the control set-up relay X to negative. Relay C1 operates and provides an obvious energizing circuit for the circuit breaker closing coil CC1 through armature b.

When the breaker closes, the manual control indication relay CR will be energized through front contact and armature b of the breaker position indicating relay G1. This connects the line conductors 13 and 14 to the substation battery through armatures b and a of relay CR, for effecting operation of the receiving relay P' at the dispatching office.

Operation of relay P' provides an energizing circuit for the breaker position indicating relay 45 over a circuit extending from negative through the operating winding of the relay 45, conductor 203, contact member c of the point selection key K1, conductors 204 and 205, armature b and back contact of the relay Y, conductor 206', armature a and front contact of sequence relay 43, conductor 207, armature c and front contact of the receiving relay P' to battery positive.

The position indicating relay 45 picks up and completes an energizing circuit for the red indicating lamp R through armature b and its front contact. At the same time the circuits for the green lamp G and the white disagreement lamp W are interrupted at the back contact of armature b.

An automatic operation at the remote substation results in substantially the same sequence of operation as described in connection with the system of Figs. 2b and 2c, in that the stepping relay SR is automatically started, and steps the dispatching office stepping relay SRD in synchronism therewith to operate the drive relays 59 and 60.

Instead of utilizing an all-direct current supervisory control system such as illustrated in Figs. 1b, 1c and 2b, 2c, or an audio frequency-direct current system such as illustrated in Figs. 1e, 1c and 2e, 2c, having audio frequency transmitters at the dispatching office, audio frequency receivers and direct current indication equipment at the remote substation, and direct current indication receiving equipment at the dispatching office as hereinbefore described, it is to be understood that the system of Figs. 1e, 1c, and 2e, 2c may be readily modified to provide an all-frequency system by substituting for the battery potentials in connection with the drive relay 59, the automatic indication control relay 63, the automatic sending control relay 64, the trip-free indication relay IC, and the manual indication control relay CR, a frequency transmitter of a frequency F3 different from those used at the dispatching office and a frequency transmitter of a fourth frequency F4 disposed to be keyed by the manual control indication relay TR (relay 56 would function to transfer the line conductors from the F3 frequency transmitter to the F4 transmitter). The receiving relays P' and N' at the dispatching office would, of course, be frequency responsive instead of polarity responsive, just as are the receiving relays RR1 and RR2 at the substation.

Furthermore, it will be realized that the system of Figs. 1b, 1c and 2b, 2c may also be modified so as to utilize transmitters and receivers operating on frequencies F1 and F2 at each dispatching office and substation, instead of the polarity responsive equipment, as shown. The transmitting relays F1 and F2 may be used to control transmitters or oscillators in the manner illustrated in Fig. 1c, while using the relays 59, 63, CR, 1c and 64, and TR to control transmitters operating on frequencies F1 and F2, respectively, at the remote substation. The receiving relays P' and N' could then be replaced by frequency responsive relays, as might also the receiving relays P and N at the substation without further changing the system. It will also be obvious that instead of using frequency responsive equipment with a direct wire signal channel, as shown, the all-frequency systems may be used with carrier frequency on power lines or propagated through space by radio or the like.

From the above description and the accompanying drawings, it will be apparent that I have provided a self-checking supervisory control system which requires a minimum of different frequency signals for effecting its operation. By utilizing only a pair of distinctive signal impulses, whether of different frequencies or different polarities, and using a predetermined number of impulses of each of the signals in producing the point selection code, the possibility of error in the selection is greatly reduced, since not only a predetermined total number of impulses must be received, but an equal number of each must be received in order to set up an operating circuit. By utilizing a counting chain at the remote substation and checking the number of impulses received, before transmission of the operate code, the reliability of the system is greatly increased, since the possibility of faulty operation is thereby reduced to a minimum. By utilizing, for example, three pulses each of two different signals, either of opposite polarities or different frequencies, twenty different combinations or arrangements are possible, thus facilitating the control of a relatively large amount of equipment with a minimum of control equipment. A self-checking system embodying the features of my invention greatly reduces the time required for a given operation, since the check-back feature between every step is no longer necessary.

Since certain changes may be made in the above-described construction, and different embodiments of the invention may be made without departing from the spirit and scope thereof, it is intended that all the matter contained in the above description and shown in the accompanying drawings shall be considered as illustrative, and not in a limiting sense.

I claim as my invention:

1. In a supervisory control system for controlling and supervising apparatus units at a remote substation from a dispatching office connected thereto by a single signal channel, sending means operable to apply signal impulses of different characteristics but of the same duration to the channel, circuit means including a point selection key for each control point connected to effect selective operation of the sending means to produce different arrangements of a fixed number of each of said signal impulses, receiving means at the remote substation including relay means selectively responsive to said signal impulses, a control relay at the substation individual to each apparatus unit to be controlled, and circuit means including said relay means connected to be selectively responsive to said different arrangements for connecting said control relays upon receipt of the fixed number of each of said signal impulses for operating in accordance with the particular arrangement of the signal impulses produced.

2. A supervisory control system for controlling and supervising apparatus units at a remote subtation from a dispatching office comprising, sending means operable to produce signal impulses of the same duration but of two different characteristics, a relay chain at each of the remote substation and the dispatching office, circuit means including a point selection key individual to each apparatus unit connected to operate the sending means selectively to produce different combinations each consisting of the same number of each of said signal impulses, and receiving means at the remote substation selectively responsive to said signal impulses connected to control the relay chain at the remote substation in accordance with the order of said impulses of different characteristics, and circuit means responsive to operation of the relay chain at the remote substation operable to provide a check on the point selection.

3. A self-checking supervisory control system for controlling apparatus units at a remote substation from a dispatching office over a single signalling channel comprising, transmitting means at the dispatching office operable to produce signal impulses of uniform duration but of two distinctive characteristics, control means including a point selection key individual to each apparatus unit to be controlled connected to effect selective operation of the transmitting means for producing different arrangements of the signal impulses each consisting of the same total number of impulses and same number of pulses of each kind, but arranged in different orders depending upon which point selection key is operated, receiving means at the remote substation including relay means selectively responsive to the signal impulses, a relay chain comprising counting relays individually responsive to the two relay means, a control relay individual to each apparatus unit, and circuit means connecting the counting relays to selectively provide operating circuits for different ones of the control relays depending on the arrangement of signal impulses transmitted.

4. A self-checking supervisory control system for remotely located apparatus units comprising, transmitting means operable to produce signal impulses of uniform duration but of two distinctive characteristics, circuit means including a point selection key individual to each apparatus unit to be controlled connecting the transmitting means for selective operation to produce different arrangements of a given number of each of said distinctive signal impulses dependent on which key is operated, a pair of receiving means at the remote substation individually responsive to said distinctive signal impulses, a chain of counting relays individually responsive to operation of each of the receiving means, control means individual to each apparatus unit, and circuit means connecting the control means for operation in response to operation of the chain of counting relays.

5. In a self-checking supervisory control system for a plurality of remotely located apparatus units, transmitting means at a dispatching office operable to produce two distinctive types of signal impulses of uniform duration, circuit means including a point selection key individual to each apparatus unit to be controlled at a remote substation connected to effect selective operation of the transmitting means for producing a selection code comprising a fixed total number of impulses consisting of a predetermined number of each of said signal impulses in different arrangements, switch means operable to set up an operating circuit for causing the transmitting means to transmit an operating code, relay means responsive to the termination of the predetermined number of said signal impulses to complete said operating circuit, receiving means at the remote substation selectively responsive to said signal impulses, a chain of counting relays at the remote substation individually responsive to the operation of one each of the receiving means, release relay means operable to release the counting relays upon the receipt of more than the predetermined number of signal impulses, additional release relay means responsive to operation of the receiving means, said additional release relay means being operable upon receipt of fewer than the predetermined number of signal impulses to release the counting relays, and a control relay disposed to be connected by the counting relays for operation in response to receipt of the operating code.

6. In a self-checking supervisory control system for controlling apparatus units at a remote substation from a dispatching office over a single interconnecting signalling channel, transmitting means at the dispatching office operable to transmit two distinctive types of signal impulses of the same duration, a point selection key individual to each apparatus unit to be controlled, a chain of counting relays, circuit means connecting the keys and counting relays to provide operating circuits for selectively operating the transmitting means to transmit different predetermined arrangements consisting of a given number of each of said distinctive types of signal impulses depending on which key is operated, a pair of receiving means at the remote substation each responsive to a different one of said distinctive types of signal impulses, a chain of counting relays for each receiving means, a pair of control relays for effecting operations of each apparatus unit, circuit means connecting the counting relays of each chain to provide operating circuits for different ones of the control relays when the given number of each chain operates depending on which of the counting relays operate, relay means responsive to operation of each apparatus unit to provide a different signal impulse for each operation, indicating means at the dispatching office individual to each apparatus unit, and circuit means including contact means of the point selection key for each apparatus unit providing control circuits for the indicating means in accordance with which the key is operated and which signal impulse is received from the remote substation.

7. In a self-checking supervisory control system for controlling apparatus units at a remote substation, transmitting means at a dispatching office operable to produce distinctive signal impulses of the same duration, circuit means including a plurality of point selection keys disposed to effect selective operation of the transmitting means to produce different arrangements of the same fix number of each of said signal impulses, receiving means at the remote substation individually responsive to each of said distinctive signal impulses, control means individual to each apparatus unit at the remote substation, a control key individual to each apparatus unit operable to effect selective operation of the transmitting means when the apparatus unit is selected to produce a predetermined operating signal impulse, relay means at the remote substation individually responsive to a fixed number of operations of each of the receiving means to set up an operating circuit for the control means of one of the apparatus units, transmitting means at the remote substation operable to transmit apparatus unit position indicating signal impulses, receiving means at the dispatching office operable in synchronism with the transmitting means at the remote substation, position indicating means at the dispatching office responsive to the operation of said receiving means, circuit means at the remote substation including contact means responsive to operation of the control means operable to prevent operation of the transmitting means at the remote substation, and relay means at the remote substation responsive to operation of the control means to transmit a position signal for an apparatus unit operated from the dispatching office.

8. In a self-checking supervisory control system transmitting means at a dispatching office operable to transmit voltage impulses of opposite polarities over a signalling channel connecting a remote substation to the dispatching office for selecting and controlling the operation of apparatus units at the substation, control means at the dispatching office operable in a predetermined sequence, circuit means including a point selection key individual to each apparatus unit to be controlled at the substation connected to effect selective operation of the transmitting means to produce a predetermined number of impulses consisting of equal numbers of each polarity and arranged in different patterns, receiving means at the substation responsive to each polarity only, a chain of counting relays individual to each receiving means, control means for operating each apparatus unit, and circuit means including contact means of the counting relays connected to selectively provide operating circuits for the control means.

9. In a supervisory control system, signal means including sending means operable to apply signal impulses of two different frequencies to a signal channel, a pair of transmitting relays each operable to cause the signal means to produce a signal of a different frequency, relay means operable in a predetermined sequence, circuit means including a point selection key individual to each apparatus unit to be controlled at a remote station and said relay means connecting the transmitting relays for selective operation to produce a predetermined number of said signal impulses in different patterns, receiving equipment including a pair of receiving relays at the remote substation each responsive only to a signal impulse of a different one of said frequencies applied to the channel, a separate chain of counting relays for each receiving relay having a common set of sequence relays cooperative therewith, a control relay individual to each apparatus unit, circuit means including contacts of said counting relays connecting said control relays to be selectively responsive to said different patterns of signals, and reset means resposive to fewer than the predetermined number of signals to restore the receiving equipment to an inoperated position.

10. In a supervisory control system, transmitting relays at a dispatching office operable to reversibly connect a signalling channel between the dispatching office and a remote substation to a direct current source, circuit means including a point selection key individual to each of a plurality of apparatus units to be controlled at the substation connecting the transmitting relays for selective operation to connect the channel to the source a predetermined number of times and in opposite senses in different predetermined patterns to select control points for the apparatus units at the substation, a pair of oppositely polarized receiving relays connected to the channel at the substation, a chain of counting relays associated with each receiving relay including common sequence relays disposed to effect sequential operation among the counting relays, control means for each apparatus unit to be controlled, circuit means including contact members of the counting relays disposed to selectively provide operating circuits for different ones of the control relays, relay means at the dispatching office operable a predetermined time after the transmitting relays are operated in one of the predetermined patterns to effect operation of one of the transmitting relays to effect operation of the apparatus unit at the control point selected, indicating control means responsive to operation of the control means for the apparatus unit selected to selectively connect the channel to a direct current source with one polarity or the other, and position indicating means at the dispatching office including circuits set up by the point selection keys, and a pair of polarized relays responsive to the polarity of the channel.

11. In a supervisory control system, the combination with a signalling channel connecting a dispatching office and a remote substation having apparatus units to be controlled, of sending means at the dispatching office operable to produce signal impulses of two different frequencies, control means including a point selection key for each apparatus unit to be controlled operable to effect selective operation of the sending means to produce a predetermined number of signal impulses of each frequency in different arrangements, receiving means at the substation selectively responsive to said frequencies, counting means including relay means selectively responsive to operation of the receiving means, apparatus unit control means individual to each apparatus unit to be controlled, and circuit means including contact means of said relay means connected to be selectively responsive to operation of the counting means for connecting one of the apparatus unit control means for operation.

WILLARD A. DERR.

REFERENCES CITED

The following references are of record in the file of this patent:

UNITED STATES PATENTS

| Number | Name | Date |
|---|---|---|
| 1,709,031 | McCoy | Apr. 16, 1929 |
| 1,745,072 | Wensley | Jan. 28, 1930 |
| 1,793,828 | Remington | Feb. 24, 1931 |
| 1,913,188 | Bruckel et al. | June 6, 1933 |
| 2,276,646 | Boswau | Mar. 17, 1942 |
| 2,368,826 | Hailes et al. | Feb. 6, 1945 |
| 2,456,533 | Preston et al. | Dec. 14, 1948 |